United States Patent [19]

Sieger

[11] 4,139,096

[45] Feb. 13, 1979

[54] TACKLE BOX IMPROVEMENT

[75] Inventor: Samuel M. Sieger, Lancaster, Pa.

[73] Assignee: Woodstream Corporation, Lititz, Pa.

[21] Appl. No.: 803,758

[22] Filed: Jun. 6, 1977

[51] Int. Cl.² .................. B65D 85/04; B65D 1/36
[52] U.S. Cl. .................. 206/315 R; 43/54.5 R; 206/409; 220/20
[58] Field of Search ............... 206/315, 314, 389, 409, 206/45.31, 45.34; 220/20; 43/54.5 R, 57.5 R

[56] References Cited

U.S. PATENT DOCUMENTS

| | | | |
|---|---|---|---|
| 718,114 | 1/1903 | Finney | 206/314 |
| 1,982,390 | 11/1934 | Lewis | 206/45.31 |
| 2,082,490 | 6/1937 | Goldsmith | 206/389 |
| 2,123,022 | 7/1938 | Pilliod et al. | 206/45.34 |
| 2,579,131 | 12/1951 | Tinsley | 206/409 |
| 2,834,144 | 5/1958 | Jones | 206/315 |
| 3,410,018 | 11/1968 | Woolworth | 43/54.5 R |
| 3,490,169 | 1/1970 | Tweed | 43/57.5 R |

*Primary Examiner*—William T. Dixson, Jr.
*Attorney, Agent, or Firm*—Holman & Stern

[57] ABSTRACT

Disclosed is an improvement to tackle box compartments facilitating the orderly retention of components useful in the fishing art, such as individual pieces of fishing line or coils of fishing line leaders. A cover having an access opening is provided to partially enclose a compartment in the tackle box. The access opening is dimensioned to be smaller than the relaxed or expanded diameter of the fishing implement coil. The coil after insertion through the access opening, expands to the internal dimensions of the compartment and is retained therein by the cover over the compartment.

2 Claims, 8 Drawing Figures

TACKLE BOX IMPROVEMENT

BACKGROUND OF THE INVENTION

The present invention relates to improvements in fishing tackle boxes.

As is well known in the fishing art, numerous types of filamentary line segments are necessary in order to properly entice fish to one's hook. Generally, a tackle box is utilized to carry assorted hooks, lines, leaders, swivels, etc. Compartments have been provided for the purpose of keeping some semblance of order in one's tackle box. Individual implements can be stored in the individual compartments. Most items, such as weights, swivels, hooks, etc. can be placed in a compartment and will remain there unless the tackle box is grossly disturbed [turned upside down or knocked over on its side]. However, the various assorted line segments, which are utilized in fishing, do not act in a similar manner.

Several different types of line segments could be required in the average tackle box. There may be sections of what is commonly referred to as a heavy gauge monofiliment nylon line for the purpose of connecting a fishing hook or plug to a lighter line which is ultimately connected to the fishing rod. This stronger and tougher section of line is useful in preventing the fish or objects on the bottom from abrading and breaking the lighter weight fishing line itself.

Similarly, the line segment could consist of stainless steel or other metallic wire in a monofiliment or braided form which serves a similar purpose. While the fishing line generally is carried wound in a coiled fashion on a spool, it is generally fixed so that it cannot inadvertantly remove itself from the spool. The necessity for carrying only one or two extra spools of fishing line does not pose a great problem in the ordering of one's tackle box. However, it is generally not common to carry a separate spool upon which to wind the numerous flexible line segments that are utilized as fishing leaders. So many more of these are generally required that to wind each one on a separate spool would take up more room than is available in the common tackle box. Therefore, generally the fishing line leaders are coiled and inserted into a tackle box compartment. A single compartment may have a plurality of coils of leaders at any one time, with each coil possibly containing swivels, weights, and/or hooks.

The problem with prior art fishing tackle boxes occurs due to the tendency of fishing line leaders to straighten out or uncoil themselves. Even when placed perfectly flat in the bottom of a tackle box compartment, most coils will eventually begin to expand with the ultimate result that the coil escapes the compartment and begins to uncoil in the tackle box. Even in the event a coil of its own accord would remain in the tackle box, the removing of an adjacent coil in the tackle box is often times more than enough to disturb the remaining coils such that they escape the compartment and uncoil in the tackle box. As is obvious to those who have engaged in the sport of fishing, the difficulties and hazards associated with expanding and unraveling coils of leaders are many. Besides the basic entanglement with other fishing lines and materials in the tackle box, the hooks and swivels serve to delay and impede the quick removal of other implements as well as the leaders themselves from the tackle box.

The solution in the past has been to attach a pivotal cover over the tackle box compartment in order to completely enclose the materials contained therein. While this has enjoyed a modicum of success, it is not uncommon to have a number of fishing line leaders to leap out from their confining compartment at the unwary angler who has the misfortune of opening the top cover. Even assuming the coils stay in their place in the compartment when the cover is opened, the removal of one leader will often times result in all the leaders in a particular compartment being released in a tangled heap. Thus, it can be seen that a modern fishing tackle box has a number of disadvantages where the storage of coils of fishing line leaders and the like are concerned.

SUMMARY OF THE INVENTION

Therefore, it is an object of the present invention, to provide a cover for a tackle box compartment such that coils of fishing line leaders and the like are retained therein unless forceably removed.

It is a further object of the present invention to provide a cover to tackle box compartments with said cover having an access aperture smaller than the dimensions of an expanded coil of fishing line leader.

It is a further object of the present invention to provide a cover for tackle box compartments for the forceable retention of coils of fishing line leaders or the like which can be retroactively fitted to existing tackle boxes.

It is a still further object of the present invention to provide an improvement to tackle boxes such that a cover for forceably retaining coils of leader lines and the like is removable and can be repositioned among the compartments in a tackle box according to the desires of the fisherman.

The above and other objects are achieved by providing a cover for partially enclosing the tackle box compartment, the cover having an access opening therein through which a tightly coiled fishing line leader or the like can be inserted. Upon release of the tightly coiled fishing line leader, the coil will immediately expand to at least the smallest internal dimension of the compartment. However, the cover to the compartment prevents inadvertant escape of the leader from the compartment because the coil of fishing leader has expanded to a dimension greater than the size of the access hole.

BRIEF DESCRIPTION OF THE DRAWINGS

These and other objects, features and advantages will be more fully appreciated with reference to the accompanying drawings wherein.

DETAILED DESCRIPTION OF A PREFERRED EMBODIMENT

Figure 1:
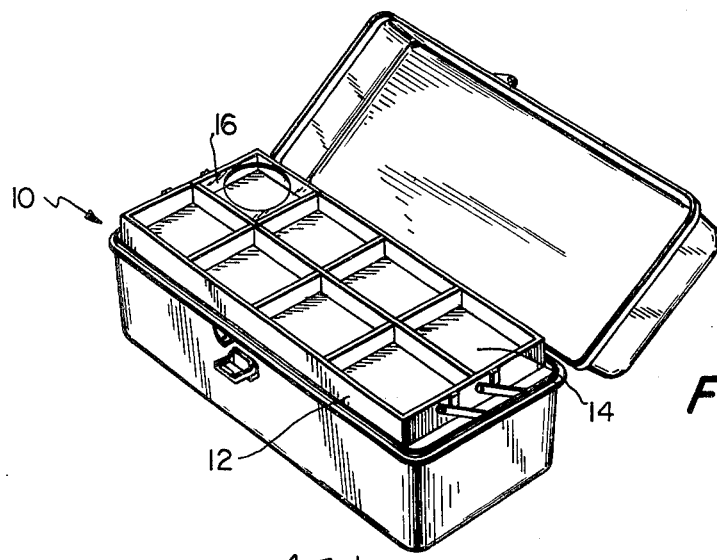
FIG. 1 is a perspective view of a typical tackle box including the present invention.

Referring now to the drawings wherein reference numerals designate identical parts throughout the several views, FIG. 1 shows a typical tackle box 10 having at least one shelf 12 mounted therein. The shelf includes a number of compartments 14 which may be of similar or widely differing shape. A compartment cover 16 is shown enclosing one of the compartments of the shelf.

Figure 2:
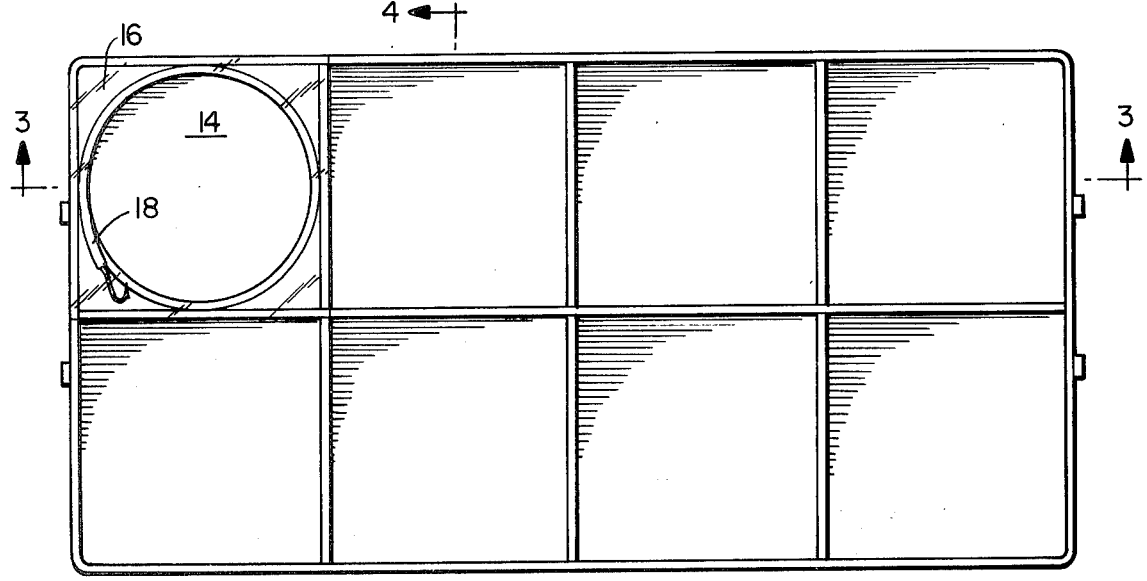
FIG. 2 is a top view of the tray of the tackle box depicted in FIG. 1.

FIG. 2 more clearly shows the position of cover 16 with respect to compartment 14. A typical fishing leader 18 is in its stored position inside the compartment 14. This can more clearly be seen by reference to the cut-away view in FIG. 3.

Figure 3:
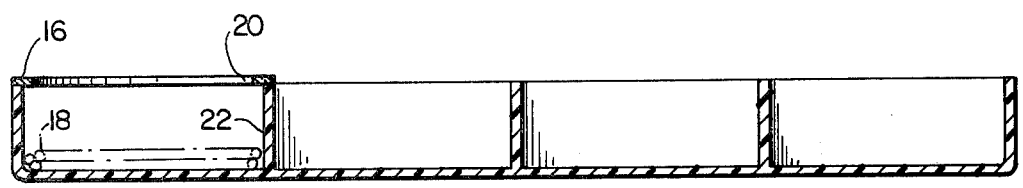
FIG. 3 is a cross sectional view along lines 3—3 of the tray in FIG. 2.
Figure 4:
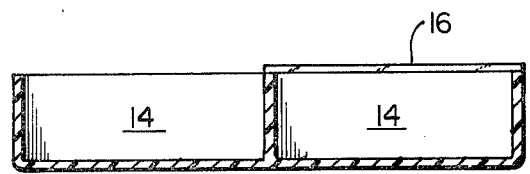
FIG. 4 is a cross sectional view along lines 4—4 of the tackle box tray shown in FIG. 2.

As can be seen in FIGS. 2, 3 and 4, the cover consists of a flat plate with an aperture 20 located therein. It is noted that the aperture is of a smaller dimension than the internal dimensions of the compartment over which it is placed. This permits the tightly coiled fishing leader 18 to be easily inserted through aperture 14 and released, whereupon the leader uncoils itself to fit the internal dimensions of the compartment. In the event the leader further unwinds such that it forces coils of the leader up the side wall 22 of the compartment, the lip created by cover 16 will prevent the coil from escaping the confines of the tackle box compartment. Obviously, if the tackle box compartment were rectangular in nature, the only dimensional requirement would be that the aperture be related to the size of the compartment such that a lip exists over the top of the compartment so as to prevent inadvertant release of the fishing line leader.

Figure 5:
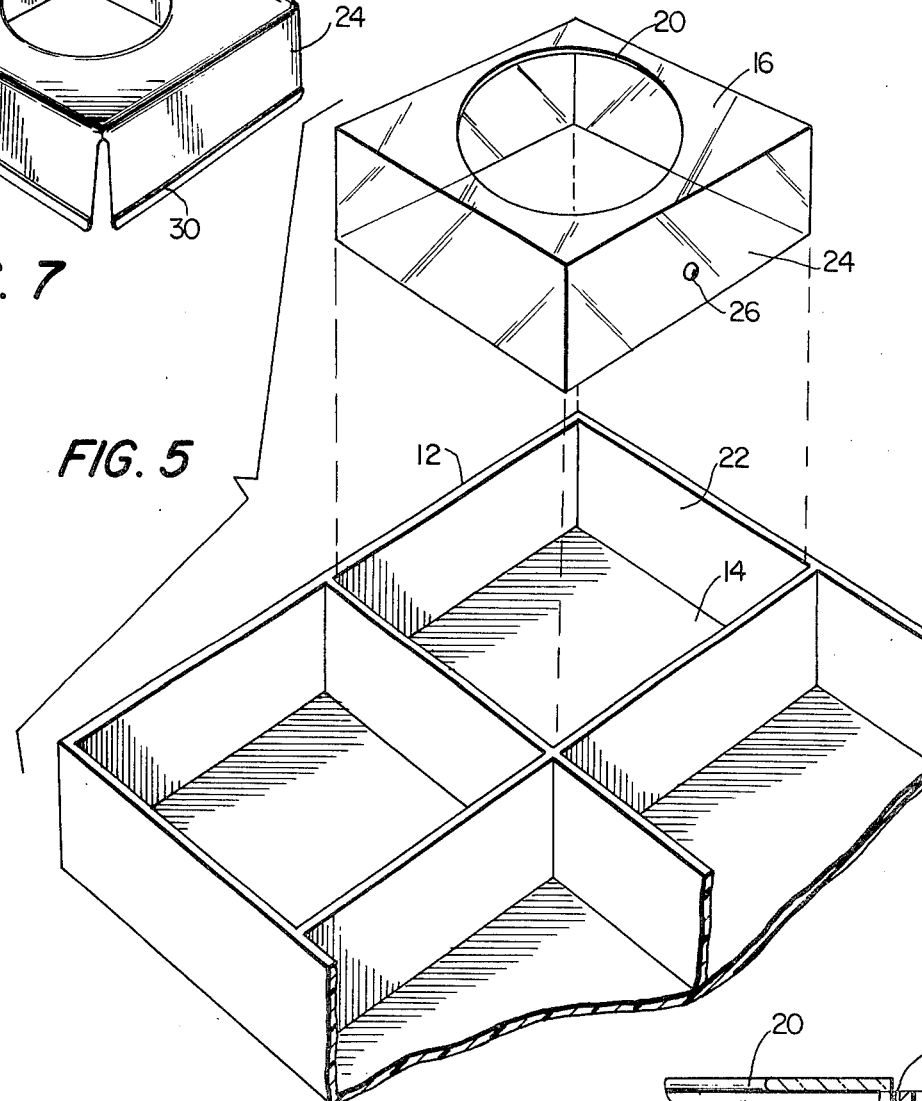
FIG. 5 is an exploded view showing the slidable engagement of the invention with a typical tackle box tray.

FIG. 5 depicts an embodiment of the present invention which, unlike the embodiment shown fixably attached to the compartment in FIGS. 1–4, is removably fixed in the compartment. Cover 16 includes side portions 24 which extend at right angles from the plane of the cover and are sized and dimensioned to be slidably inserted within the side walls 22 of the compartment. This embodiment of the applicant's invention allows existing tackle boxes to be easily and quickly retrofitted with the present invention without the necessity of gluing or fixably mounting the cover over the compartment as shown in FIGS. 1–4. A projection 26 may be provided to increase the friction between portions 24 and side walls 22 to prevent the cover from falling out of the compartment in the event of violent movement. As can be seen, the mere provision of projection 26 to an already properly sized cover portion 24, would, when the cover is slidably inserted into the compartment, require a certain deflection of the side portion 24 and/or compartment wall 14 resulting in an increased friction between the side wall 22 and projection 26. This increased friction may be sufficient to retain the cover 16 in its proper position within the compartment.

Figure 6:
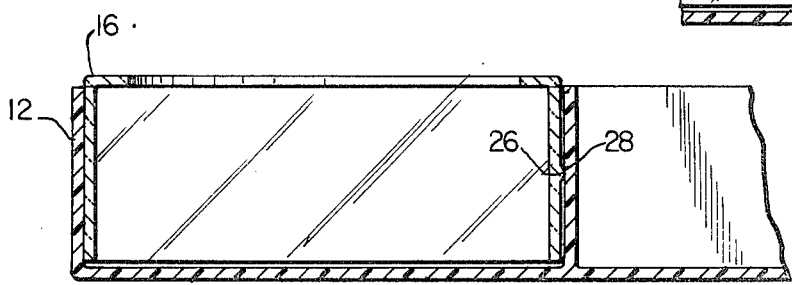
FIG. 6 is a cross sectional view of a cover in its operative position within the compartment of a tackle box.

FIG. 6 is a cross sectional view of the cover assembly in FIG. 5 inserted into a compartment 14. However, there is an additional detent 28 into which projection 26 fits forming a more secure means for retaining cover 16 in position on the tackle box shelf 12.

Figure 7:
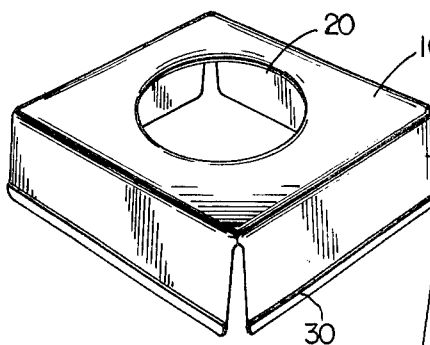
FIG. 7 is a further embodiment of a tackle box cover.

FIG. 7 shows a further embodiment of the invention wherein each of the side portions 24 are flexed outward from a perpendicular relationship to the top 16. It will be seen that when side portions 24 are flexed inward and the top inserted into a compartment, the flexing of sides 24 will bias lip 30 against side walls 22 increasing the frictional retention of cover 16 by compartment 14.

Figure 8:
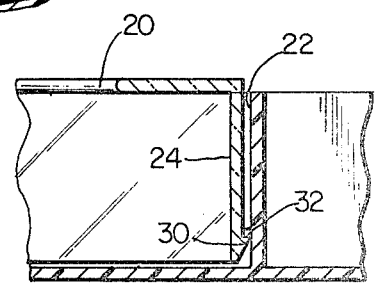
FIG. 8 is a cross sectional view depicting the insertion of the embodiment of FIG. 7 into a typical tackle box compartment.

A further embodiment is shown in FIG. 8 wherein lip 30 of side portion 24 engages a further projection 32 to firmly retain the cover in the required position.

As should be clear to those of ordinary skill in the art, in view of the above teachings, the operation of this invention is quite simple. For tackle boxes which come equipped with this invention or for those who are retrofitted with an embodiment of this invention, the leader line or the like, which is to be properly stored, is shaped into a tight coil whose diameter is small enough that it may be inserted with ease through access aperture 20 into the inner portion of compartment 14. Upon inserting the coil, it is released to expand under its own uncoiling force to fill the inner dimensions of the compartment, as shown in FIGS. 2 and 3. A number of coils may be so inserted into a single compartment. In order to remove a single coil, the turns of the leader line making up the coil are grasped by the angler's hand withdrawn through aperture 20. Withdrawing the already expanded leader line coil will merely require some distortion from the shape the coil has attained in its expanded state in compartment 14 as it is drawn through smaller access aperture 20. Ordinarily this can be accomplished without any disturbance at all to other coils stored in the same compartment, although in the unlikely event that a hook engages a portion of another coil, it is a simple matter to reach in, unhook the offending structure, and complete the leader line removal. All other stored leader lines will remain safely stored in compartment 14 without cluttering up the other compartments or lower portion of the tackle box.

Obviously, in view of the above teachings, a number of materials can conveniently be used to form cover 16 and side portions 24 [in embodiments where necessary]. A great variety of plastics and/or metals could be used, some of which could be transparent in order to more easily see the contents of compartment 14. In other embodiments, it may be advantageous to use a material which is opaque to sunlight and other harmful radiation which would serve to protect the sun sensitive nylon leaders stored therein. As noted earlier, a great variety of shapes and sizes are available for the configuration of cover 16, and its associated structures, and is limited only by the sizes and configurations of the tackle box to which it is afixed. Similarly, the access aperture 20 could be in any one of a number of geometric shapes and is shown as a circle in the present invention for illustrative purposes only. Similarly, when, or if, materials are utilized in which frictional contact between side portions 24 and the side walls of the compartment 22 is insufficient to properly retain the cover on the compartment, any number of devices could be utilized to fixably or removably retain the cover in its operative position over the compartment 14.

Therefore, in view of the teaching of this invention, a large number of possibilities and applications will become obvious to one of ordinary skill in the art. The invention is not believed to be limited by the embodiments recited for explanatory purposes herein, but many uses will become obvious in view of these teachings to those in the art and the invention is limited only by the scope of the claims appended thereto.

I claim:

1. A tackle box having a lid, at least one shelf with a plurality of separate compartments, at least one of said compartments being of rectangular shape in plan and having substantially planar peripheral sides walls, a bottom wall and an open top portion, said compartment being intended for removably storing at least one elongated flexible filamentary element such as a fishing line leader, or the like, said filamentary element being collapsible to a form having a relatively small minimum dimension and expanding under its own resilience into a coil of larger diameter than a minimum transverse cross section through said compartment, and cover means for partially enclosing said compartment, said cover means defining an access opening, said access opening having a minimum dimension greater than said relatively small minimum dimension of the element in its collapsed form and a maximum dimension smaller than the larger diameter of said expanded coil whereby upon being inserted into said compartment in its collapsed state, said coil expands to a dimension larger than said aperture preventing accidental release of the coil from the compartment, said cover means comprising a generally planar rectangular sheet and said access opening comprising a circular aperture in said sheet, said cover means including supporting means for supporting said cover means on said compartment, said supporting means comprsing side portions integral with said planar sheet and extending downwardly from and substantially at right angles to said planar sheet along peripheral edges of said sheet, said side portions being sized and dimensioned for slidably fitting along said compartment periperal side walls and each side portion having a depth substantially equal to the depth of said compartment side walls, outwardly projecting means on said side portions, said side portions being flexed inwardly by the compartment side walls to provide frictional engagement between said outwardly projecting means and planar portions of the respective compartment side walls to retain said cover means on said compartment.

2. The tckle box of claim 1, wherein said outwardly projecting means comprises a lip formed along a terminal edge of each of said side portions and wherein at least one of said compartment walls includes a projection engaging over the lip of one of said side portions.

* * * * *